(12) United States Patent
Wang

(10) Patent No.: US 8,465,814 B2
(45) Date of Patent: Jun. 18, 2013

(54) HIGH STRENGTH FOAM GLASS

(75) Inventor: Bo Wang, Lompoc, CA (US)

(73) Assignee: Imerys Filtration Minerals, Inc., San Jose, CA (US)

( * ) Notice: Subject to any disclaimer, the term of this patent is extended or adjusted under 35 U.S.C. 154(b) by 1206 days.

(21) Appl. No.: 12/281,988

(22) PCT Filed: Mar. 20, 2007

(86) PCT No.: PCT/US2007/064362
§ 371 (c)(1),
(2), (4) Date: Oct. 27, 2008

(87) PCT Pub. No.: WO2007/109646
PCT Pub. Date: Sep. 27, 2007

(65) Prior Publication Data
US 2009/0220713 A1 Sep. 3, 2009

Related U.S. Application Data

(60) Provisional application No. 60/783,861, filed on Mar. 21, 2006.

(51) Int. Cl.
*A47G 19/22* (2006.01)
*B28B 21/00* (2006.01)
*B28B 21/72* (2006.01)
*B28B 23/00* (2006.01)
*B28B 23/08* (2006.01)
*B29D 22/00* (2006.01)
*B29D 23/00* (2006.01)
*B32B 1/08* (2006.01)
*F16L 9/10* (2006.01)

(52) U.S. Cl.
USPC ...... 428/34.5; 428/34.4; 428/304.4; 428/649; 428/650

(58) Field of Classification Search
USPC .................. 428/34.4, 34.5, 304.4, 649, 650
See application file for complete search history.

(56) References Cited

U.S. PATENT DOCUMENTS

| | | | |
|---|---|---|---|
| 2,431,884 A | 12/1947 | Neuschotz | |
| 2,602,782 A | 7/1952 | Zoradi | |
| 2,779,136 A | 1/1957 | Hood et al. | |
| 3,150,988 A | 9/1964 | Dess et al. | |
| 3,203,813 A | 8/1965 | Gajardo et al. | |
| 3,348,994 A | 10/1967 | Rees et al. | |
| 3,459,565 A | 8/1969 | Jones et al. | |
| 3,592,619 A | 7/1971 | Elmer | |
| 3,793,039 A | 2/1974 | Rostoker | |
| 3,874,861 A | 4/1975 | Kurz | |
| 3,951,632 A | 4/1976 | Seki et al. | |
| 3,986,883 A | 10/1976 | Toth et al. | |
| 4,198,224 A | 4/1980 | Kirkpatrick | |
| 4,207,113 A | 6/1980 | Yoshino et al. | |
| 4,244,721 A | 1/1981 | Gupta et al. | |
| 4,248,810 A | 2/1981 | Erskine | |
| 4,430,108 A | 2/1984 | Hojaji et al. | |
| 4,432,798 A | 2/1984 | Helferich et al. | |
| 4,758,538 A | 7/1988 | Satoh et al. | |
| 4,923,332 A | 5/1990 | Sanocki et al. | |
| 4,990,398 A | 2/1991 | Fukumoto et al. | |
| 5,069,960 A | 12/1991 | Fukumoto et al. | |
| 5,195,843 A * | 3/1993 | George et al. | 405/63 |
| 5,516,351 A | 5/1996 | Solomon et al. | |
| 5,588,977 A * | 12/1996 | Pavlov et al. | 65/17.4 |
| 6,368,527 B1 | 4/2002 | Gontmakher et al. | |
| 6,478,993 B2 | 11/2002 | Gontmakher et al. | |
| 6,913,643 B2 | 7/2005 | Dejaiffe | |
| 6,964,809 B2 | 11/2005 | Hojaji et al. | |
| 7,354,542 B1 | 4/2008 | Girgin | |
| 7,459,208 B2 | 12/2008 | Wang | |
| 2004/0162210 A1 | 8/2004 | Dejaiffe | |
| 2005/0016093 A1 | 1/2005 | Buarque De Macedo | |
| 2005/0019542 A1 | 1/2005 | Hojaji et al. | |
| 2005/0031844 A1 | 2/2005 | Wang | |

FOREIGN PATENT DOCUMENTS

| | | |
|---|---|---|
| CN | 1 076 671 A | 9/1993 |
| DE | 118 972 | 4/1976 |
| JP | 53-125442 | 11/1978 |
| JP | 54-8614 A | 1/1979 |
| JP | 58-88128 | 5/1983 |
| JP | 58-99128 | 6/1983 |
| JP | 61-55128 | 3/1986 |
| JP | 63-144144 | 6/1988 |
| JP | 64-52626 | 2/1989 |
| JP | 64-56333 | 3/1989 |
| JP | 2-59482 | 2/1990 |
| JP | 2-92842 | 4/1990 |
| JP | 2001-294436 | 10/2001 |
| WO | WO 2007/109646 A2 | 10/2007 |

OTHER PUBLICATIONS

English-Language Derwent Abstract of CN 1 030 565, Tao et al. Jun. 15, 1997.
English-Language Abstract of JP 01 157433, Sumitomo Metal Mining Co., Ltd., Jun. 20, 1989.
English-Language Abstract of JP 58 217433, Asahi Chem. Ind. Co. Ltd., Dec. 17, 1983.
English-Language Abstract of JP 58 217438, Asahi Chem. Ind. Co. Ltd., Dec. 17, 1983.
English-Language Abstract of SU 1 089 069, XP-002195963, Stone Silicates Res., Apr. 30, 1984.
Saakyan, E. R., "Multifunctional Foam Glasses From Volcanic Glassy Rocks", 2302 Glass and Ceramics, vol. 48, Nos. 1 / 2,1991, pp. 3-5.
International Search Report and Written Opinion for PCT/US2007/064362.

* cited by examiner

*Primary Examiner* — Michael C Miggins
(74) *Attorney, Agent, or Firm* — Finnegan, Henderson, Farabow, Garrett & Dunner, L.L.P.

(57) ABSTRACT

Disclosed herein are foam glasses and compositions comprising such foam glasses, which can be used, for example, in structural applications. The foam glass can have one or more properties, such as a density ranging from about 20 lb/ft³ to about 100 lb/ft³, a compressive strength of at least about 650 psi, and an alumina content of at least about 5% by weight, relative to the total weight of the foam glass. Also disclosed are methods for preparing foam glasses.

37 Claims, No Drawings

HIGH STRENGTH FOAM GLASS

CLAIM OF PRIORITY

This application is a national stage entry of and claims the benefits of priority to PCT International Application No. PCT/US2007/064362 filed Mar. 20, 2007, which claims priority to U.S. Provisional Application No. 60/783,861 filed Mar. 21, 2006, both of which are incorporated by reference herein in their entireties.

DESCRIPTION OF THE INVENTION

1. Field of the Invention

Disclosed herein are foam glasses and compositions comprising such foam glass, which can be used, for example, in structural applications. Also disclosed are methods for preparing foam glass.

2. Background of the Invention

Glass is an inorganic product of fusion that has cooled to a rigid condition without crystallizing. The most common glasses are silicate glasses. The basic structural unit of silicate glasses has a silicon atom tetrahedrally coordinated to four surrounding oxygen atoms. Similar to the crystalline silicates, the $SiO_4$ tetrahedra in the silicate glasses are found in a variety of configurations depending on the oxygen-to-silicon ratio in the glass compositions.

Some glasses are naturally occurring, such as perlite, pumice, obsidian, pitchstone, and volcanic ash. Others, such as soda-lime glasses, are produced synthetically. For example, soda-lime glass may be made by melting batches of raw materials containing the oxides of silicon (e.g., $SiO_2$), aluminum (e.g., $Al_2O_3$), calcium (e.g., CaO), sodium (e.g., $Na_2O$), and sometimes potassium (e.g., $K_2O$) or lithium (e.g., $Li_2O$) in a furnace, and allowing the resulting melt to cool to produce the amorphous product. Glasses may be made in a wide variety of shapes, including sheets or plates, cast shapes, or fibers. Methods of manufacturing the principal families of glasses have been previously reported (e.g., Scholes, Modern Glass Practice, 7th ed. by C. Greene, Boston, Mass., CBI Publishing Company, Inc., 1974). Mineral wools, rock wools, and silicate cottons are generic names for manufactured fibers in which the fiber-forming substances may be slag, certain rocks, or glass (Kujawa, Industrial Minerals and Rocks, 5th ed., Littleton, Colo.: Society for Mining, Metallurgy, and Exploration, Inc., pp. 199-201, 1983).

Foam glasses are a class of lightweight glass materials having numerous sealed small cells. The base glass composition can be similar to typical window glasses, which can typically contain 70-73% $SiO_2$, 1-3% $Al_2O_3$, 0.1-0.5% $Fe_2O_3$, 13-15% $Na_2O$, 0-2% $K_2O$, 5-7% CaO and 3-5% MgO (by weight).

Several techniques have been used to make foam glasses. For example, by leaching out the borate phase from a borosilicate glass, a silica-rich phase with very fine pores (10 to 25 Å) is obtained (Elmer, U.S. Pat. No. 3,592,619). The moisture trapped in the fine pores by leach solution can cause the fine pores to expand after heating the leached glass at 1300-1425° C. by flash-firing. The foaming and sintering of the porous glass particles occurs generally simultaneously. Alternately, foam glasses can also be made by blowing air or other gases into molten glass and allowing the molten glass to cool and entrap the bubbles or cells in the solidified glass. However, these products have structural characteristics, such as low-compressive strength, low-transverse strength and low-dimensional stability, which are often not desirable in structural applications.

SUMMARY OF THE INVENTION

Accordingly, there remains a need to provide a low density foam glass having properties such as compressive strength, transverse strength, and/or dimensional stability.

DESCRIPTION OF THE EMBODIMENTS

For example, in one embodiment, there is disclosed a foam glass having a density ranging from about 20 $lb/ft^3$ to about 100 $lb/ft^3$, a compressive strength of at least about 650 psi, and an alumina content of at least about 5% by weight, relative to the total weight of the foam glass.

Density can indicate the degree to which the foam glasses retain a porous structure with closed cells. For example, density can be determined by dividing the sample weight by the measured volume, and can be reported in units of $lb/ft^3$ or in units of $kg/m^3$.

In one embodiment, the foam glass can have a density of less than about 100, or less than about 80 $lb/ft^3$. In another embodiment, the density ranges from about 20 $lb/ft^3$ to about 40 $lb/ft^3$, from about 25 $lb/ft^3$ to about 35 $lb/ft^3$, from about 50 $lb/ft^3$ to about 80 $lb/ft^3$, or from about 60 $lb/ft^3$ to about 75 $lb/ft^3$.

Compressive strength measures the stress at which a material fails under the load. Disclosed herein are foam glass compositions with high compressive strength, such as when the foam glass is for use in construction applications.

The compressive strength of the foam glass may be measured based on a standard method of the American Society of Testing and Materials. (See, e.g., ASTM Designation C165 (Reapproved 2000), Standard Test Method for Measuring Compressive Properties of Thermal Insulations, in which the disclosure for measuring compressive strength is incorporated herein by reference.) For example, a 2.0 inch square specimen having a thickness of 0.5 inch can be placed between 8.0 inch square loading surfaces. The specimen can then be compressed at a crosshead speed of 0.008 in./min continuously until a maximum load is reached. The maximum load can be recorded as the compressive strength. The compressive strength can be reported in units of psi or in units of kPa.

In one embodiment, the foam glass can have a compressive strength of at least about 700 psi, such as a compressive strength of at least about 900 psi, at least about 1000 psi, at least about 1500 psi, at least about 2000 psi, at least about, at least about 2500 psi, or at least about 3000 psi.

Transverse strength measures the breaking load of a material in a three-point bending mode in a horizontal plane. Disclosed herein are foam glass compositions with high transverse strength, such as when the foam glass is for use in roofing tile applications.

The transverse strength of the foam glass may be measured based on a standard method of the American Society of Testing and Materials. (See, e.g., ASTM Designation C67-01, Standard Test Methods for Sampling and Testing Brick and Structural Clay Tile, ASTM Designation 1167-96, Standard Specification for Clay Roof Tiles, in which the disclosure for measuring transverse strength is incorporated herein by reference.) For example, a 14×8 inch specimen having a thickness of 1.0 inch can be placed with the bottom surface of the sample resting on tow lower support and with a single point load being applied to the upper surface of the sample at a load rate of 400 pounds per minute until fracture. The load at fracture can be recorded as the transverse strength. The transverse strength can be reported in units of pounds or kilograms.

In one embodiment, the foam glass can have a transverse strength of at least about 350 pounds for the 14×8 inch specimen having a thickness of 1.3 inch with test span of 12 inch, such as a transverse strength of at least about 390 pounds for the 14×8 inch specimen having a thickness of 0.625 inch with test span of 10 inch, at least about 400 pounds for the 14×8 inch specimen having a thickness of 1.0 inch with test span of 12 inch.

In one embodiment, the foam glass has an alumina content ranging from about 5% to about 15% by weight, relative to the total weight of the foam glass, such as an alumina content ranging from about 6% to about 12% by weight, or an alumina content ranging from about 8% to about 10% by weight.

In one embodiment, the foam glass comprises boron in an amount ranging from about 5 pphg to about 15 pphg. As used herein, "pphg" refers to parts per hundred of the total weight of the foam glass. In another embodiment, the foam glass comprises boron in an amount ranging from about 7 pphg to about 10 pphg.

In one embodiment, the foam glass comprises calcium carbonate in an amount ranging from about 5 pphg to about 10 pphg.

In one embodiment, the foam glass comprises silica in an amount ranging from about 50% to about 55% by weight, relative to the total weight of the foam glass.

In one embodiment, the foam glass is a porous material. For example, the foam glass may have an average pore size ranging from about 0.5 mm to about 3 mm, such as an average pore size ranging from about 0.1 mm to about 2 mm, or an average pore size ranging from about 0.2 mm to about 1 mm.

In one embodiment, the foam glass further comprises other materials such as reinforcing materials and colorants. When used, a structural or reinforcing material may include a metal mesh, such as a high strength nickel containing alloys. One commercially available alloy that can be used as a reinforcing material in the present disclosure is Inconel™, which refers to a family of trademarked high strength austenitic nickel-chromium-iron alloys that have exceptional anti-corrosion and heat-resistance properties. These commercial alloys contain high levels of nickel and can be thought of as super-stainless steels.

In another embodiment, the reinforcing material is chosen from, for example, carbon fiber, glass fiber, metal fiber, ceramic fiber, woven fiber, metal honeycomb, ceramic honeycomb, fibrous minerals, such as wollastonite.

In one embodiment, the foam glass further comprises at least one colorant. Exemplary colorants include $Fe_2O_3$, Co(+2) or Co (+3) oxides such as $Co_3O_4$, and Cu(+1) and Cu(+2) compounds, e.g., oxides such as CuO, and $Cu_2O$, or sulfates such as $CuSO_4$.

Another embodiment provides methods for preparing the foam glass disclosed herein. Accordingly, one embodiment provides a method for making a foam glass comprising:
(a) combining a natural glass feed with at least one foaming agent;
(b) milling the combined natural glass feed and the at least one foaming agent to form a powdered mixture;
(c) melting the powdered mixture to form a molten product;
(d) cooling and annealing the molten product to form a foam glass having a density of less than about 100 lb/ft$^3$ and a compressive strength of at least about 650 psi.

In one embodiment, the natural glass feed in (a) refers to any perlite, such as an unexpanded or expanded perlite ore. Perlite ore is a hydrated natural glass containing typically about 72-75% $SiO_2$, 12-14% $Al_2O_3$, 0.5-2% $Fe_2O_3$, 3-5% $Na_2O$, 4-5% $K_2O$, 0.4-1.5% CaO (by weight), and small concentrations of other metallic elements. Perlite can also contain small amounts of chlorine, $TiO_2$, and MnO. Perlite ore is distinguished from other natural glasses by a higher content (2-10% by weight) of chemically bonded water, the presence of a vitreous, pearly luster, and characteristic concentric or arcuate onion skin-like (perlitic) fractures.

Expanded perlite includes one or more cells, or parts of cells, in which a cell is essentially a void space partially or entirely surrounded by walls of glass, usually formed from expansion of gases when the glass is in a softened state.

In another embodiment, the feed for the foam glass can comprise other natural glasses, also commonly referred to as volcanic glasses. Natural glasses are typically formed by the rapid cooling of siliceous magma or lava. In one embodiment, the natural glass can be fine perlite ore or expanded fine perlite. In another embodiment, the foam glass is derived from natural glasses chemically equivalent to rhyolite. Other natural glasses include those that are chemically equivalent to trachyte, dacite, andesite, latite, basalt, and obsidian, which generally refers to dark, most often black, massive natural glasses that are rich in silica ($SiO_2$). Obsidian glasses may be classified into subcategories according to their silica content. For example, rhyolitic obsidians typically contain about 73% $SiO_2$ by weight (Berry, L. G. et al. Mineralogy $2^{nd}$ Ed., New York: Freeman and Co., pp. 540-542, 1983).

In one embodiment, the natural glass feed further may be supplemented with other minerals, such as, for example, diatomaceous earth (natural, calcined and flux calcined), fly ash, vitrifiable minerals such as liparite, rhyolite, pearlite, obsidian and volcanic ash. In another embodiment, the natural glass feed may be supplemented with other glasses such for example recycled cullet glass.

In one embodiment, the natural glass feed in (a) has a selected particle size distribution. In certain embodiments, natural glass feed with finer particle size may be desired. In one embodiment, the natural glass feed may comprise waste fine perlite ore.

In one embodiment, the particle size distribution of the natural glass feed can be determined by scattered light from a laser beam projected through a stream of particles. The amount and direction of light scattered by the particles can be measured by an optical detector array and then analyzed by a microcomputer that calculates the size distribution of the particles in the sample stream. Data reported may be collected on a Leeds and Northrup Microtrac X100 laser particle size analyzer (Leeds and Northrup, North Wales, Pa.). This instrument can determine particle size distribution over a particle size range from 0.12 to 704 microns. Bottom particle size ($d_{10}$) and top particle size ($d_{90}$) are defined as that size for which 10 percent or 90 percent of the volume that is smaller than the indicated size, respectively.

In one embodiment, the natural glass feed in (a) has a median particle size ($d_{50}$) less than about 50 μm, such a median particle size ($d_{50}$), less than about 20 μm, less than about 10 μm, less than about 5 μm, or less than about 3 μm.

In one embodiment, the natural glass feed in (a) has an $Fe_2O_3$ content ranging from about 0.5% to about 8% by weight, relative to the total weight of the perlite, such as an $Fe_2O_3$ content ranging from about 3% to about 5% by weight, relative to the total weight of the perlite.

In one embodiment, the natural glass feed is chosen from unexpanded fine perlite ore and expanded fine perlite. In another embodiment, prior to (a), the natural glass feed comprises perlite that has been processed and expanded at high temperature to make expanded perlite. The processing of perlite can include comminution of the ore (crushing and grinding), screening, thermal expansion, and air size separation of the expanded material. For example, perlite ore can be crushed, ground, and separated to a predetermined particle size range (e.g., passing 30 mesh), then the separated material can be heated in air at a temperature of 870-1100° C. in an expansion furnace (see, e.g., Neuschotz, U.S. Pat. No. 2,431,884 and Zoradi, E. D., U.S. Pat. No. 2,602,782, in which the disclosures of heating in an expansion furnace are incorporated herein by reference), where the simultaneous softening of the glass and vaporization of contained water leads to rapid expansion of glass particles to form a frothy glass material with a bulk volume up to 20 times that of the unexpanded ore. The expanded perlite can then separated to meet the size specification of the final product.

The at least one foaming agent can release gas or vapor at the foaming temperature during the glass melting to form the sealed cell structure. In one embodiment, the at least one foaming agent is chosen from organic carbonates, metal carbonates, metal sulfates, and carbon black. Exemplary metal carbonates include alkali metal and alkaline earth metal carbonates, such as, for example, $Na_2CO_3$, $K_2CO_3$, $CaCO_3$, and $MgCO_3$. Exemplary metal sulfates include alkali and alkaline earth metal sulfates.

The milling in (b) can be performed by any method known in the art, e.g., by using a steel mill, ball mill, hammer mill, or similar type crusher, such as stirred media mill and pin mill.

In one embodiment, the melting in (c) is performed at a temperature ranging from about 1800° F. to about 2100° F., such as a temperature ranging from about 1800° F. to about 1850° F. In one embodiment, the melting is performed at 1800° C. In another embodiment, the melting is performed at a temperature ranging from about 1850° F. to about 1900° F., or from about 1900° F. to about 1950° F., or from about 1950° F. to about 2000° F., or from about 2050° F. to about 2100° F.

In one embodiment, the cooling and solidifying in (d) is performed by allowing the melted mixture from (c) to cool to about room temperature.

In one embodiment, the foam glass in (d) has a density of less than about 80 lb/ft³, or any other density disclosed herein.

In one embodiment, the foam glass is prepared by optionally mixing natural glass feed with appropriate amounts of soda ash, calcium carbonate, and in some cases with boric acid. Examples of typical compositions include: soda ash from 10 percent to 16 percent, calcium carbonate from 5 percent to 10 percent, and boric acid from 4 percent to 12 percent. After fine milling in a steel mill or a ball mill, the mixture can be placed in a heat resistant metal or alloy container such as nickel crucibles, and high temperature resistant alloy such as Inconel™ molds coated with high melting powders preferable aluminum oxide as the releasing agent. The foam glass is optionally formed by melting the mixture at a temperature ranging from 1800° F. to 2100° F. for 1 minute to 30 minutes or more as needed in an electrical furnace, followed by annealing by allowing it to cool to room temperature. The annealing process can be achieved by furnace cooling the sample from about 1200° F. or 1300° F. to about room temperature.

Glass network formers, such as boron, and additional glass network modifiers, such as sodium and calcium, may be used in the process of making the foam glass products. Accordingly, in one embodiment, the combining in (a) comprises combining the natural glass feed with at least one foaming agent and at least one glass network former and/or at least one glass network modifier.

The foam glass disclosed herein can be used in applications such as light weight construction products, thermal and acoustic insulating products, or other applications where conventional foam glasses are used. Exemplary applications include roof tile, cladding, wallboard, floating dock, water meter box, and above-ground pipe.

One embodiment provides a brick comprising the foam glass disclosed herein. In one embodiment, the foam glass used for brick applications can comprise a porous material having an average pore size ranging from about 0.5 mm to about 3 mm.

Another embodiment provides a roofing tile comprising the foam glass disclosed herein. In one embodiment, the foam glass used for roofing tile applications can comprise a porous material having an average pore size ranging from about 0.1 mm to about 2 mm, such as an average pore size ranging from about 0.2 mm to about 1 mm.

In another embodiment, the foam glass used for roofing tile applications can have a transverse strength ranging form about 200 pounds to about 500 pounds (12 inch span), such as a transverse strength ranging form about 250 pounds to about 400 pounds (12 inch span). Transverse strength can be measured according to ASTM C 1167-96, C67-01 as the breaking load of the foam glass sample in a three-point bending mode in a horizontal plane with the bottom surface of the sample resting on two lower support and with a single point load being applied to the upper surface of the sample at a load rate of 400 pounds per minute until fracture.

Another embodiment provides a pipe comprising the foam glass disclosed herein.

In some embodiments, products comprising the foam glass disclosed herein comprises a glaze surface, such as a glaze surface on at least one face. For example, a natural glaze on the surface of the finish products formed during the firing process can be used for roof tile applications.

EXAMPLES

Example 1

A commercially available unexpanded fine perlite ore product Harborlite® MB grade (World Minerals) was used as the natural glass feed. The perlite used had a particle size distribution (PSD) from 2 µm ($d_{10}$) to 11 µm ($d_{90}$). 100 parts of this feed were mixed with 10 parts of soda ash, 10 parts calcium carbonate, and 8 parts boric acid. The mixture was then milled in a ceramic ball for 120 minutes. The milled mixture (1500 g) was placed in 14(L)×8(w)×3(H) inch Inconel™ molds coated with aluminum oxide as the releasing agent. The foam glass was formed by melting the mixture at 2050° F. (1121° C.) for 5 minutes in an electrical furnace and then annealed by allowing the sample to cool to room temperature. The foam glass thus obtained had a natural neutral color glaze on its top surface and weighed 1274 g with a dimension of 14.125×8.315×0.73 inch. The foam glass had a pore size distribution from 0.1 mm to 1 mm in diameter, a density of 57.5 lb/ft³ (921 kg/m³) and a transverse strength of 393 pounds (178 kg) for 10 inch span.

Example 2

Example 1 was repeated, except that 2100 gram of the milled mixture was used. The foam glass thus obtained had a natural neutral color glaze on top surface and weighed 1763 g with a dimension of 8.25×14.19×1.0 inch. The foam glass had a pore size distribution from 0.1 mm to 1 mm in diameter, a density of 57.8 lb/ft³ (926 kg/m³) and transverse strength of 400 pounds (181 kg) for 12 inch span.

Example 3

Example 1 was repeated, except that 2850 grams of the milled mixture was melted at 2050° F. (1121° C.) for 30 minutes. The foam glass thus obtained had a natural neutral color glaze on top surface and weighed 2452 g with a dimension of 8.375×15.25×1.39 inch. The foam glass had a pore size distribution from 0.1 mm to 1 mm in diameter, a density of 52.6 lb/ft³ (843 kg/m³) and transverse strength of 350 pounds (159 kg) for 12 inch span.

Example 4

Example 1 was repeated, except that 1300 grams of the milled mixture was placed in a 9(L)×5(W)×(4(H) inch stainless steel mold and melted at 2000° F. (1093° C.) for 30 minutes. The foam glass thus obtained had a natural neutral color glaze on top surface and had a pore size distribution from 0.1 mm to 1 mm in diameter, a density about 57 lb/ft³ (913 kg m³), average compressive strength of 2847 psi (19629 kPa) (measured on three small pieces of samples cut from the original foam glass sample).

Example 5

Example 1 was repeated, except that 16 parts of soda ash was used. 1100 grams of the milled mixture was placed in a 9(L)×5(W)×4(H) inch stainless steel mold and melted at 1800° F. (982° C.) for 25 minutes. The foam glass thus obtained had a natural neutral color glaze on top surface and had a pore size distribution from 0.5 mm to 1.5 mm in diameter, a density about 29 lb/ft³ (645 kg/m³), average compressive strength of 717 psi (4944 kPa) (measured on three small pieces of samples cut from the original foam glass sample).

Example 6

Example 1 was repeated, except that 3 parts of iron oxide was added. 6.2 kilograms of the milled mixture was placed in a 18(L)×18(W)×3(H) inch stainless steel mold and melted at 1875° F. (1023° C.) for 6 hours. The foam glass thus obtained had a natural clay-color natural glaze on top surface and weighed 5.4 kilograms with a dimension of 18(L)×18(W)×1 (H) inch. The foam glass had a pore size distribution from 0.2 mm to 1 mm in diameter and a density about 62 lb/ft³ (993 kg/m³).

The physical properties of the foam glass are listed in Tables I and II below.

TABLE I

| | Transverse Strength | | | | | | | | |
|---|---|---|---|---|---|---|---|---|---|
| | Width | | Thickness | | Density | | Test Span | | Failure Load | |
| Sample ID | in | cm | In | cm | lb/ft³ | kg/m³ | In | cm | lb | kg |
| Example 1 | 8.315 | 21.12 | 0.625 | 1.59 | 57.5 | 921.1 | 10 | 25 | 393 | 178 |
| Example 2 | 8.250 | 20.96 | 1.000 | 2.54 | 57.8 | 925.9 | 12 | 30 | 400 | 181 |
| Example 3 | 8.250 | 20.96 | 1.300 | 3.30 | 52.6 | 842.6 | 12 | 30 | 350 | 159 |
| Flat Clay Roof Tile | | | | | ~129.3[a] | ~2071.2[a] | 12 | 30 | min 250[b] | min 113[b] |

[a] commercial sample
[b] ASTM C1167

TABLE II

| | Compressive Strength | | | | | |
|---|---|---|---|---|---|---|
| | Area | | Load | | Compressive Strength | |
| Sample ID | in² | cm² | lb | kg | psi | kPa |
| Example 4A | 2.42 | 15.61 | 7612 | 3453 | 3150 | 21718 |
| Example 4B | 2.64 | 17.03 | 6772 | 3072 | 2570 | 17720 |
| Example 4C | 2.57 | 16.58 | 7258 | 3292 | 2820 | 19443 |
| Example 4 (Average) | | | | | 2847 | 19629 |
| Example 5A | 3.38 | 21.80 | 2376 | 1078 | 700 | 4856 |
| Example 5B | 3.46 | 22.45 | 2055 | 932 | 590 | 4068 |
| Example 5C | 3.59 | 23.16 | 3086 | 1400 | 860 | 5929 |
| Example 5 (Average) | | | | | 717 | 4944 |

As shown in Table II, the foam glass disclosed herein can have a compressive strength greater than 650 psi (e.g., greater than 3100 psi) with a density less than about 80 lb/ft³. The foam glass can be water proof and/or fire resistant. Color agents such as $Fe_2O_3$ and $Co_3O_4$ can be added into the glass compositions to make products with various colors for different applications. Compared to conventional clay construction products, which typically have densities over 120 lb/ft³, the foam glasses disclosed herein can be significantly lighter in weight while maintaining higher compressive and transverse strength. The energy cost to make the perlite foam glass can be significantly lower than the process used for clay products since no wet mixing, extrusion and drying processes are needed in the production of foam glass. The production cycle time may be less due to the elimination of these extra steps. In certain embodiments, the use of waste fine perlite ore as feed material can reduce the perlite foam glass production cost and/or can reduce waste disposal cost.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A foam glass having a density ranging from about 20 lb/ft$^3$ to about 100 lb/ft$^3$, a compressive strength of at least about 650 psi, and an alumina content of at least about 5% by weight, relative to the total weight of the foam glass.

2. A foam glass according to claim 1, wherein the density ranges from about 25 lb/ft$^3$ to about 35 lb/ft$^3$.

3. A foam glass according to claim 1, wherein the density ranges from about 60 lb/ft$^3$ to about 75 lb/ft$^3$.

4. A foam glass according to claim 1, wherein the compressive strength is at least about 700 psi.

5. A foam glass according to claim 1, wherein the compressive strength is at least about 900 psi.

6. A foam glass according to claim 1, wherein the compressive strength is at least about 1000 psi.

7. A foam glass according to claim 1, wherein the compressive strength is at least about 1500 psi.

8. A foam glass according to claim 1, wherein the compressive strength is at least about 2000 psi.

9. A foam glass according to claim 1, wherein the compressive strength is at least about 2500 psi.

10. A foam glass according to claim 1, wherein the compressive strength is at least about 3000 psi.

11. A foam glass according to claim 1, wherein the alumina content ranges from about 5% to about 15% by weight, relative to the total weight of the foam glass.

12. A foam glass according to claim 1, wherein the alumina content ranges from about 6% to about 12% by weight, relative to the total weight of the foam glass.

13. A foam glass according to claim 1, wherein the alumina content ranges from about 8% to about 10% by weight, relative to the total weight of the foam glass.

14. A foam glass according to claim 1, further comprising boron in an amount ranging from about 5 pphg to about 15 pphg.

15. A foam glass according to claim 1, further comprising boron in an amount ranging from about 7 pphg to about 10 pphg.

16. A foam glass according to claim 1, further comprising calcium carbonate in an amount ranging from about 5 pphg to about 10 pphg.

17. A foam glass according to claim 1, further comprising silica in an amount ranging from about 50% to about 55% by weight, relative to the total weight of the foam glass.

18. A foam glass according to claim 1, wherein the foam glass is a porous material having an average pore size ranging from about 0.5 mm to about 3 mm.

19. A foam glass according to claim 1, wherein the foam glass is a porous material having an average pore size ranging from about 0.1 mm to about 2 mm.

20. A foam glass according to claim 1, wherein the foam glass is a porous material having an average pore size ranging from about 0.2 mm to about 1 mm.

21. A pipe comprising the foam glass according to claim 1.

22. A foam glass according to claim 1, wherein the density ranges from about 20 lb/ft$^3$ to about 40 lb/ft$^3$.

23. A brick comprising the foam glass according to claim 22.

24. A brick according to claim 23, wherein the foam glass is a porous material having an average pore size ranging from about 0.5 mm to about 3 mm.

25. A foam glass according to claim 1, wherein the density ranges from about 50 lb/ft$^3$ to about 80 lb/ft$^3$.

26. A roofing tile comprising the foam glass according to claim 25.

27. A roofing tile according to claim 26, wherein the foam glass is a porous material having an average pore size ranging from about 0.1 mm to about 2 mm.

28. A roofing tile according to claim 26, wherein the foam glass is a porous material having an average pore size ranging from about 0.2 mm to about 1 mm.

29. A roofing tile according to claim 26, wherein the foam glass has a transverse strength ranging from about 200 pounds to about 500 pounds, 12 inch test span.

30. A roofing tile according to claim 26, wherein the foam glass has a transverse strength ranging from about 250 pounds to about 400 pounds, 12 inch test span.

31. A foam glass according to claim 1, further comprising at least one reinforcing material.

32. A foam glass according to claim 31, wherein the at least one reinforcing material is a nickel-chromium-iron alloy mesh.

33. A foam glass according to claim 1, further comprising at least one colorant.

34. A foam glass according to claim 33, wherein the at least one colorant is chosen from $Fe_2O_3$, $Co_3O_4$, $CuSO_4$, $CuO$, and $Cu_2O$.

35. A foam glass having a density of less than about 100 lb/ft$^3$, a compressive strength of at least about 650 psi, and a thickness of less than about 2 inches.

36. A foam glass according to claim 35, wherein the density is less than about 80 lb/ft$^3$.

37. A roofing tile comprising a foam glass having a density of less than about 100 lb/ft$^3$, and a compressive strength of at least about 650 psi.

* * * * *